(12) United States Patent
Tariq et al.

(10) Patent No.: US 11,416,959 B1
(45) Date of Patent: Aug. 16, 2022

(54) VISION ARCHITECTURE

(71) Applicant: Zoox, Inc., Foster City, CA (US)

(72) Inventors: Sarah Tariq, Palo Alto, CA (US); Zejia Zheng, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 365 days.

(21) Appl. No.: 16/786,288

(22) Filed: Feb. 10, 2020

(51) Int. Cl.
| | |
|---|---|
| *G06K 9/00* | (2022.01) |
| *G06T 1/20* | (2006.01) |
| *G06T 1/60* | (2006.01) |
| *G05D 1/02* | (2020.01) |
| *G05D 1/00* | (2006.01) |

(52) U.S. Cl.
CPC ............. *G06T 1/20* (2013.01); *G05D 1/0088* (2013.01); *G05D 1/0246* (2013.01); *G06T 1/60* (2013.01); *G05D 2201/0213* (2013.01); *G06T 2207/20084* (2013.01); *G06T 2207/30252* (2013.01)

(58) Field of Classification Search
CPC ... G06T 1/20; G06T 1/60; G06T 2207/20084; G06T 2207/30252; G05D 1/0088; G05D 1/0246; G05D 2201/0213
USPC ......................................................... 382/103
See application file for complete search history.

(56) References Cited

U.S. PATENT DOCUMENTS

| | | | | |
|---|---|---|---|---|
| 4,797,812 A * | 1/1989 | Kihara | ................... | G06F 13/126 710/26 |
| 5,377,337 A * | 12/1994 | Antognini | ........... | G06F 12/1036 718/100 |
| 6,738,870 B2 * | 5/2004 | Van Huben | ....... | G06F 15/17381 711/147 |
| 7,225,316 B2 * | 5/2007 | Thadani | .............. | G06F 12/1081 710/22 |
| 7,506,132 B2 * | 3/2009 | Arimilli | ............ | G06F 15/17381 711/147 |
| 9,690,722 B2 * | 6/2017 | Jarmany | ................ | G06F 13/126 710/26 |
| 11,089,105 B1 * | 8/2021 | Karumbunathan | .. | H04N 19/436 |
| 2002/0078307 A1 * | 6/2002 | Zahir | ........................ | G06F 9/52 711/141 |
| 2005/0246488 A1 * | 11/2005 | Kiba | .................... | G06F 12/0804 711/E12.04 |

(Continued)

FOREIGN PATENT DOCUMENTS

| | | | | | |
|---|---|---|---|---|---|
| CA | 2812421 | A1 * | 3/2011 | ................ | G06T 1/60 |
| EP | 3382531 | A1 * | 10/2018 | .......... | G06F 12/0607 |

*Primary Examiner* — Mahendra R Patel
(74) *Attorney, Agent, or Firm* — Lee & Hayes, P.C.

(57) ABSTRACT

Techniques for maintaining and synchronizing data is a processing pipeline data between multiple processing units to improve a system latency are described herein. For example, the techniques may include determining, in response to an invocation of vision processing on first vision data stored in a first memory range in a first memory associated with a central processing unit (CPU), that second vision data stored in a second memory range in a second memory associated with a graphic processing unit (GPU) is a modified copy of the first vision data. The second vision data may be obtained using a non-blocking operation from the second memory range. The first vision data stored in the first memory range may be replaced with the second vision data obtained from the second memory range. The vision processing may then be performed using the second vision data stored in the first memory.

19 Claims, 5 Drawing Sheets

(56) References Cited

U.S. PATENT DOCUMENTS

2018/0285117 A1* 10/2018 Surti .................... H04N 19/436

* cited by examiner

VISION ARCHITECTURE

BACKGROUND

Computer vision is used in numerous applications, such as operating autonomous vehicles, identifying individuals for security purposes, performing industrial tasks, etc. Computer vision techniques may use sensors to capture data of an environment and use this sensor data to detect objects in the environment. Such techniques may utilize multiple processors and associated memories. Allocation of memory ranges and synchronization of vision data between the multiple processors associated memories may introduce latency, which may be unacceptable in mission critical operations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
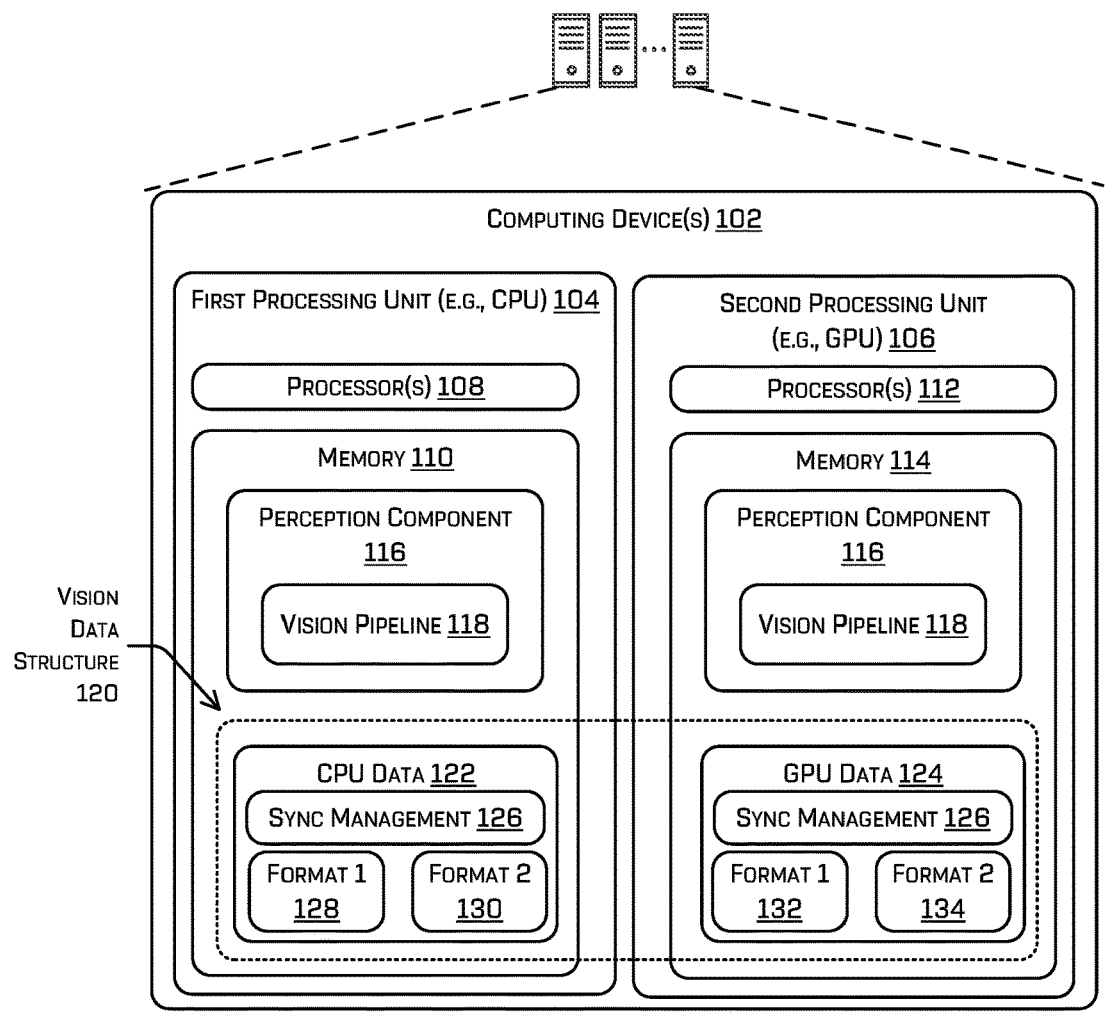
FIG. 1 illustrates an example environment in which the techniques discussed herein may be implemented.

This disclosure is directed to techniques for performing synchronization of vision data between multiple processors and associated memories during vision processing. More particularly, the techniques disclosed herein may be utilized for vision processing in automated systems, such as automated vehicle systems. In some examples, the techniques herein may be utilized to efficiently maintain synchronization between copies of vision data across multiple processors and associated memories. In addition or alternatively, the techniques herein may be utilized to efficiently maintain synchronization between copies of data in multiple formats for use in various types of vision or other processing.

Although discussed in the context of vision processing, the techniques discussed here may be applicable to a variety of processing and data, as discussed herein.

In some implementations, a vision data structure may be instantiated upon initialization of an automated operation system or a vision processing portion thereof. The vision data structure may allocate a memory range for vision data in at least one of the memories accessible by the multiple processors. In some examples, the vision data structure may be configured to allocate memory ranges in each memory when it is instantiated. In other examples, the vision data structure may allocate memory ranges in the memory of a processor which is most often involved in vision processing or which is utilized first in vision processing. More particularly, in some examples, one or more of the processors may be involved in some but not all vision processing. In such cases, the vision data structure may not allocate memory ranges in memories associated with those processors until operations are invoked on those processors.

Similarly, the vision data structure may operate to increase efficiency in memory management by maintaining the allocated memory ranges through multiple iterations of sensor data (e.g. throughout the operation of the automated operation system). In some examples, maintaining the allocated memory ranges throughout multiple iterations of sensor data may reduce latency in the vision pipeline of the automated operation system.

Further, the vision data structure may operate to increase efficiency by performing synchronization using non-blocking operations and performing such operations on an as-needed basis. For example, following a modification of vision data in a memory associated with the central processing unit (CPU), the synchronization function of the data structure may update a flag to indicate the vision data has been modified but not trigger synchronization. Instead, synchronization may be triggered when a vision processing operation is invoked at a particular processor of the one or more processors, such as, for example, a graphic processing unit (GPU). More particularly, upon invocation of a vision processing at the GPU, the synchronization function of the data structure operating at the GPU may check to see if the vision data stored in the memory associated with another processor of the one or more processors (such as the CPU) is flagged as modified. If so, the synchronization function of the data structure operating at the GPU may perform a non-blocking copy operation of the vision data to the memory associated with the GPU and resolve the flag (e.g. by updating a local indicator to a current value of the CPU vision data flag).

In addition, in some of examples, the vision data structure may operate to allocate and maintain memory locations within the memory ranges for copies of image data or other sensor data in multiple formats. For example, the vision data structure may allocate and maintain memory locations within allocated memory ranges for image data in both the NHWC format (e.g. channel last) and NCHW format (e.g. channels first) (e.g. where N is a number of images in a batch, H is a height of the image, W is a width of the image and C is a number of channels of the image). In some examples, different formats may be utilized for certain operation either due to standardization or because certain formats may provide better performance with certain operations. Thus, maintaining memory locations for both formats of image data may reduce a number of transpose or other operations to convert between the formats in, for example, a vision pipeline that utilizes both formats of image data.

Figure 2:
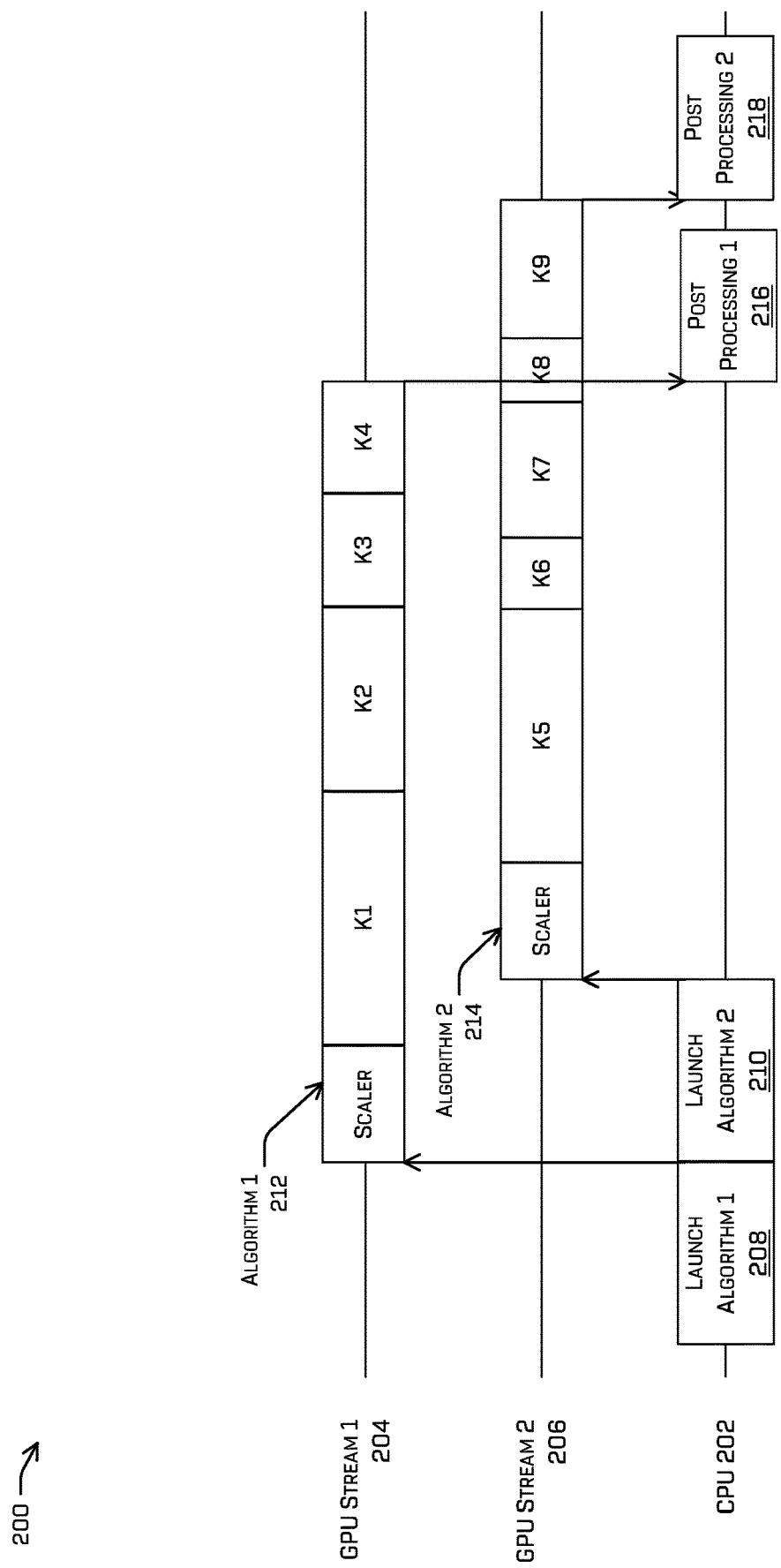
FIG. 2 depicts a block diagram of an example system for implementing the techniques described herein.

Further, when vision data is modified (e.g. when the image data of one of the formats is changed), the vision data structure may increase efficiency by updating the other format(s) of image data using non-blocking operations and performing such operations on an as-needed basis. For example, when NHWC image data is modified, the data structure may flag the modified image data as the most recent image data in the data structure. Then, when vision processing is invoked on the NCHW image data, the data structure may determine the NCHW image data is not the most recent image data and perform a transpose on the NHWC image data using non-blocking operations to generate updated NCHW image data. An example of utilizing non-blocking operation is shown in FIG. 2.

As discussed above, the techniques discussed herein may improve computer vision by, for example, reducing latency in the vision pipeline and increasing efficiency generally.

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, the computer vision operations discussed herein may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

Further while the discussion herein focuses on maintaining and synchronizing vision data for use in a vision pipeline, implementations are not so limited. For example, although discussed in the context of vision processing, the techniques discussed herein are not limited to vision-based processing and can be used on any type or combination of sensor data (e.g., lidar, radar, sonar, time-of-flight, fused sensor data (e.g., vision and lidar data), etc.). Indeed, such techniques may not be used in a vision or sensor-based context at all, and may be applicable to a variety of contexts, such as economic forecasting or weather models. Other examples may utilize similar techniques for maintaining and synchronizing other sensor data utilized by other sensor pipelines in a perception component.

FIG. 1 illustrates an example environment 100 in which the techniques discussed herein may be implemented. In particular, the environment 100 includes a computing device(s) 102 that includes a first processing unit 104 and a second processing unit 106. The first processing unit 104 includes processor(s) 108 and memory 110. Similarly, the second processing unit 106 includes processor(s) 112 and memory 114. The processors (e.g., processor(s) 108 associated with the first processing unit 104 and processor(s) 112 associated with the second processing unit 106) may each comprise one or more GPUs, one or more CPUs, one or more tensor processing units, one or more neural processing units, one or more digital signal processors, etc. In some examples, the first processing unit 104 is implemented as a CPU and the second processing unit 106 is implemented as a GPU, although other configurations may be used.

As discussed above, the first processing unit 104 and second processing unit 106 may operate in conjunction to perform perception operations, and particularly vision processing operations. As such, memory 110 and memory 114 each include a perception component 116 which may perform operations of vision pipeline 118. A vision pipeline 118 may be configured to detect one or more objects based on sensor data the pipeline received. Additional discussion of perception operations of the perception component 116 and the vision pipeline 118 thereof is provided in U.S. patent application Ser. Nos. 16/201,842, 16/234,862, 16/238,475 and 16/386,249, the entirety of which are incorporated herein by reference.

In addition, the memories 110 and 114 may store portions of the vision data structure 120. More particularly, the memory 110 may include CPU data 122 of the vision data structure 120 and the memory 114 may include GPU data 124 of the vision data structure 120.

The CPU data 122 and GPU data 124 may each include a synchronization management component 126 and multiple formats of image data associated with the vision pipeline 118 (e.g. image data in format 1 128 and 132 and image data in format 2 130 and 134). In some examples, format 1 may refer to a NHWC format of image data and format 2 may refer to a NCHW format of image data.

The synchronization management component 126 may perform operations discussed herein to maintain synchronization between the data in different memories and between the different formats of data, for example, an efficient manner.

In some implementations, the vision data structure 120 may be instantiated upon initialization of operations of the computing device 102 or of vision processing particularly. Following instantiation of the vision data structure 120, the synchronization management component 126 of the vision data structure may be invoked to perform allocation and synchronization operations.

For example, the synchronization management component 126 may allocate a memory range for vision data in at least one of the memories 110 and 114. In some examples, the vision data structure may be configured to allocate memory ranges in each memory 110 and 114. In other examples, the synchronization management component 126 may allocate memory ranges in the memory accessible by a processor which is most often involved in vision processing. More particularly, in some examples, one or more of the processors may be involved in some but not all vision processing. For example, vision processing may be performed on a CPU and not on the GPU for some iterations of sensor data. In such cases, the synchronization management component 126 may operate allocate memory ranges for CPU data 122 at initialization and delay allocating memory ranges for GPU data 124 until operations are invoked on the second processing unit 106.

Similarly, the synchronization management component 126 may operate to maintain the allocated memory ranges (e.g. once allocated) through multiple iterations of sensor data and, in some examples, throughout the operation of the automated operation system (e.g. until the autonomous vehicle including the computing devices 102 is turned off). In some examples, maintaining the allocated memory ranges throughout multiple iterations of sensor data may reduce latency in the vision pipeline of the automated operation system.

Further, the synchronization management component 126 may perform synchronization using non-blocking operations and perform such operations on an as-needed basis. For example, following a modification of CPU data 122, the synchronization management component 126 may update a flag or indicator associated with CPU data 122 to indicate the CPU data 122 has been modified (e.g. but not trigger synchronization to the GPU data 124). The flag or indicator may be implemented as a time stamp, a counter or any other manner known for allowing another processor to determine the current CPU data 122 is updated and, in some cases, whether to synchronize its own data with the CPU data 122. In some examples, the flag may be a shared memory location storing a three state value that may indicate (1) a synchronized state, (2) the GPU data is updated, or (3) the CPU data is updated. The synchronization management component 126 may check the value of the shared memory location to determine whether the data is synchronized or which copy of the data is current.

Synchronization may be triggered when a vision processing operation is invoked at the second processing unit 106. More particularly, upon invocation of a vision processing operation at the GPU, the synchronization management component 126 operating at the second processing unit 106 may determine that the flag or indicator associated with the CPU data 122 has been modified such that the GPU data 124 should be synchronized to the CPU data 122. If the CPU data is flagged as modified, the synchronization management component 126 may perform a non-blocking copy operation of the CPU data 122 to the memory range associated with the GPU data 124 and resolve the flag (e.g. by updating the shared memory location to indicate synchronization state or a local indicator to a current value of a CPU data flag).

In addition, as mentioned above, the synchronization management component 126 may operate to allocate and maintain memory locations within the memory ranges for copies of image data or other sensor data in multiple formats (e.g. formats 1 and 2). For example, the synchronization management component 126 may allocate and maintain memory locations within allocated memory ranges for image data in both NHWC and NCHW formats (e.g. where N is a number of images in a batch, H is a height of the image, W is a width of the image and C is a number of channels of the image). In some examples, maintaining memory locations for both formats of image data may reduce a number of transpose or other operations to utilized to convert between the formats.

Further, when vision data is modified (e.g. when the image data of one of the formats is changed), the synchronization management component 126 may update the other format(s) of image data using non-blocking operations and perform such operations on an as-needed basis. For example, when an NHWC image data (e.g. format 1 128) is modified, the synchronization management component 126 may flag the modified format of image data as the most recent image data in the data structure 120. Then, when vision processing is invoked on the NCHW image data (e.g. format 2 130), the synchronization management component 126 may determine the NCHW image data is not the most recent image data and perform a transpose on the NHWC image data using non-blocking operations to generate updated NCHW image data. The synchronization management component 126 may overwrite the previous NCHW image data with the updated NCHW image data (e.g. store the updated NCHW image data in the same memory location).

As mentioned above, various operations such as copying, transpose and so on may be performed using non-blocking operations. An example flow diagram 200 of utilizing non-blocking operations is shown in FIG. 2. More particularly, FIG. 2 illustrates asynchronous non-blocking operations performed by two GPU streams coordinated by a CPU 202.

As shown, at 208, the CPU 202 launches an algorithm 1 212 on the GPU stream 1 204. The algorithm 1 212 includes a scalar operations and operations K1-K4. Because the launch 208 of the algorithm 1 212 is a non-blocking operation, the call associated with the launch of algorithm 1 212 at 208 returns to the CPU immediately following the launch. Thereafter, at 210, the CPU launches an algorithm 2 214 on the GPU stream 2 206. The algorithm 2 214 includes a scalar operations and operations K5-K9.

Thereafter, algorithm 1 212 and algorithm 2 214 perform at least a portion of their respective operations in parallel until completion. More particularly, when algorithm 1 212 ends, one or more results may be returned to the CPU 202. In response, the CPU 202 may perform post processing 1 216. Similarly, when algorithm 2 214 ends, one or more results may be returned to the CPU 202 and, in response, the CPU 202 may perform post processing 2 218.

Of course, FIG. 2 merely shows one example of non-blocking operations in a particular scenario. Many other functions may be performed as non-blocking operations.

The computing device(s) 102 may be implemented as a control system of an autonomous vehicle, one or more laptop computers, desktop computers, servers, and so on. In examples, the computing device(s) 102 is configured in a cluster, data center, cloud computing environment, or a combination thereof.

The memory 110 and/or the memory 114 are examples of non-transitory computer-readable media. The memory 110 and/or the memory 114 may store an operating system and/or one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some examples, the memory 110 may have different characteristics than the memory 114. For example, the memory 110 and the memory 114 may have different memory capacities, different abilities to read and/or write (e.g., one having the ability to read and write at the same time, while the other having the ability to read and write at different times), different read/write speeds, different sized memory buses (e.g., 64-bit, 128-bit, etc.), and so on. Further, the first processing unit 104 may have different characteristics than the second processing unit 106, such as different operating speeds, different number of cores, etc.

Although the second processing unit 106 and the memory 110 are illustrated as being part of the computing device(s) 102, in some examples the second processing unit 106 and/or the memory 110 may be located elsewhere. For example, the second processing unit 106 and/or the memory 110 may be implemented on a computing device that is remote to the computing device(s) 102.

As can be understood, the components discussed herein are described as divided for illustrative purposes. However, the operations performed by the various components can be combined or performed in any other component.

The computing device(s) 102 may include one or more computing devices that are implemented at the same location and/or distributed. In one example, the first processing unit 104 is implemented on a first computing device and the second processing unit 106 is implemented on a second computing device. In another example, the first processing unit 104, the second processing unit 106 are implemented on the same computing device. In yet other examples, other configurations are used.

Figure 3:
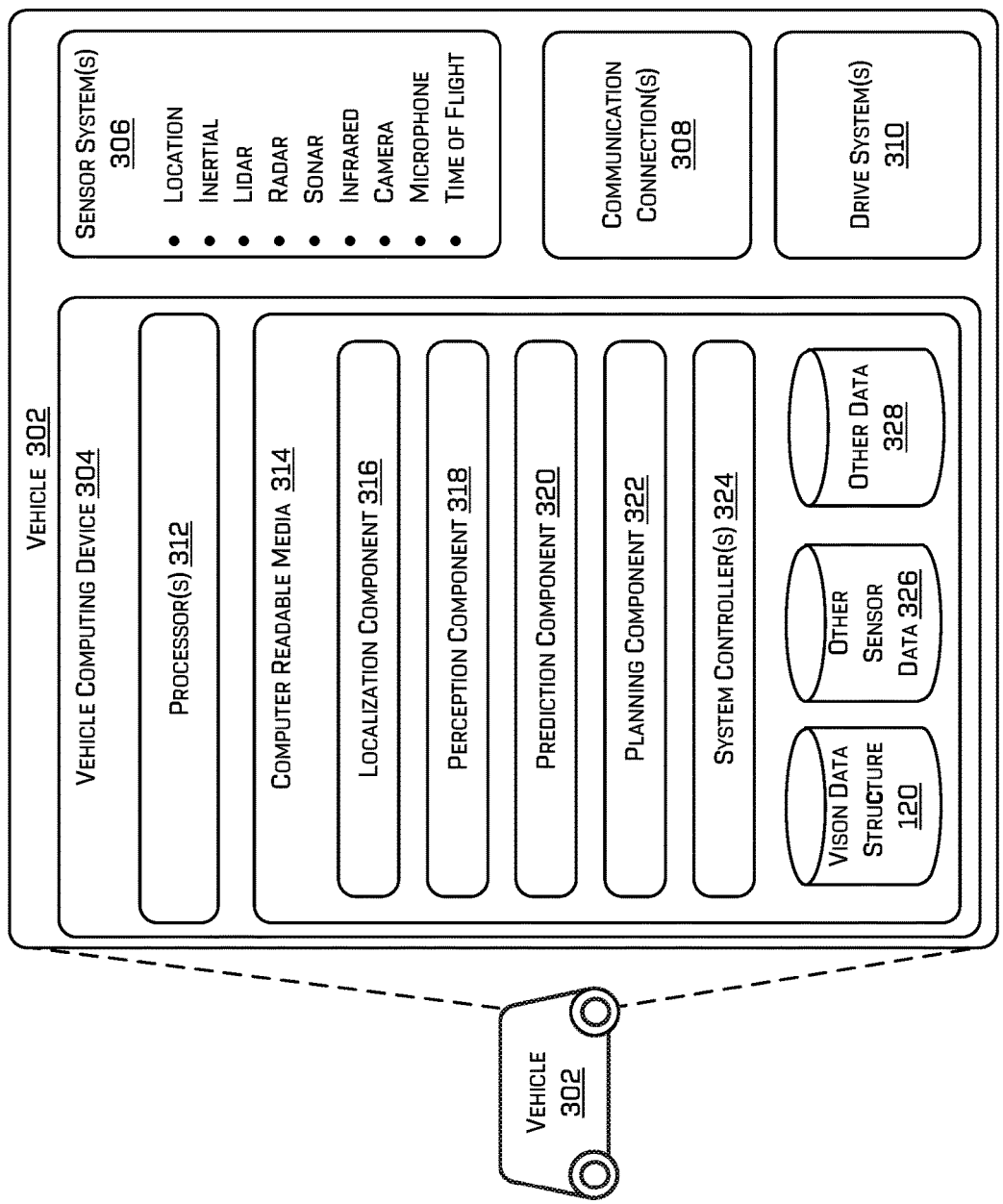
FIG. 3 depicts a block diagram of an example system for implementing the techniques described herein.

FIG. 3 is a block diagram of an example system 300 for implementing the techniques described herein, in accordance with embodiments of the disclosure. In some examples, the system 300 may include one or multiple features, components, and/or functionality of embodiments described herein with reference to FIG. 1. In some embodiments, the system 300 can include a vehicle 302. The vehicle 302 may include a vehicle computing device 304, one or more sensor systems 306, one or more communication connections 308, and one or more drive systems 310. In some examples, the computing device 304 may correspond to and/or operate to perform the function discussed above regarding computing device(s) 102.

The vehicle computing device 304 may include one or more processors 312 and computer readable media 314 communicatively coupled with the one or more processors 312. In the illustrated example, the vehicle 302 is an autonomous vehicle; however, the vehicle 302 could be any other type of vehicle, or any other system (e.g., a robotic system, a camera enabled smartphone, etc.). In the illustrated example, the computer readable media 314 of the vehicle computing device 304 stores a localization component 316, a perception component 318, a prediction component 320, a planning component 322, one or more system controllers 324 as well as a vision data structure 120, other sensor data 326 and other data 328. Though depicted in FIG. 3 as residing in computer readable media 314 for illustrative purposes, it is contemplated that the localization component 316, the perception component 318, the prediction component 320, the planning component 322, the one or more system controllers 324 as well as the vision data structure 120, the other sensor data 326 and the other data 328, may additionally, or alternatively, be accessible to the vehicle 302 (e.g., stored on, or otherwise accessible by, computer readable media remote from the vehicle 302).

In at least one example, the localization component 316 can include functionality to receive data from the sensor system(s) 306 to determine a position of the vehicle 302 (also referred to herein as localization data). For example, the localization component 316 can include and/or request/receive a map of an environment and can continuously determine a location of the autonomous vehicle within the map (e.g. localize a position of the autonomous vehicle 302 on a global map and/or a local map). In some instances, the localization component 316 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 316 can provide the localization data to various components of the vehicle 302 to determine an initial position of an autonomous vehicle for generating a candidate trajectory, as discussed herein.

In at least one example, the perception component 318 may be configured to receive sensor data (e.g., image data, radar data, lidar data, etc.) captured during one or more-time interval intervals associated with the sensor system 306. The sensor data may include the vision pipeline data of the vision data structure 120 and the other sensor data 326. The perception component 318 can include functionality to perform object detection, segmentation, and/or classification. In some examples, the perception component 318 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional or alternative examples, the perception component 318 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. The processed sensor data may be output to the prediction component 320 and/or the planning component 322.

In addition, the perception component 318 may correspond to the perception component 116 and may utilize the vision data structure 120 maintain synchronization of vision data and/or other perception component data.

The planning component 322 may determine a path for the vehicle to follow to traverse through the physical environment. For example, the planning component 322 may determine various routes and trajectories and various levels of detail. For example, the planning component 322 may determine a route to travel from a current location to a target location. For the purpose of this discussion, a route may include a sequence of waypoints for travelling between two locations.

In at least one example, the vehicle computing device 304 can include one or more system controllers 324, which can be configured to control steering, propulsion, braking, safety, emitters, communication, and other systems of the vehicle 302. These system controller(s) 324 may communicate with and/or control corresponding systems of the drive system(s) 310 and/or other components of the vehicle 302.

In some instances, aspects of some or all of the components discussed herein can include any models, algorithms, and/or machine learning algorithms. For example, in some instances, components in the computer readable media 314 such as the localization component 316, the perception component 318, the prediction component 320, and/or planning component 322, and may be implemented as one or more neural networks. For instance, the component 318 may comprise a machine learned model (e.g., neural network) which has been trained to predict speed, trajectory, and/or other characteristics of a pedestrian (or other object) based on image data.

The techniques discussed herein may be implemented in various contexts. In some examples, the techniques are implemented in the context of a machine learning application, such as TensorFlow, PyTorch, Caffe, Caffe2, etc.

In at least one example, the sensor system(s) 306 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 306 can include multiple instances of each of these or other types of sensors. For instance, the lidar sensors may include individual lidar sensors located at the corners, front, back, sides, and/or top of the vehicle 302. As another example, the camera sensors can include multiple cameras disposed at various locations about the exterior and/or interior of the vehicle 302. The sensor system(s) 306 may provide input to the vehicle computing device 304. Additionally, or alternatively, the sensor system(s) 306 can send sensor data, via the one or more networks, to one or more remote computing device(s) at a particular frequency, after a lapse of a predetermined period of time, in near real-time, etc.

The vehicle 302 can also include one or more communication connection(s) 308 that enable communication between the vehicle 302 and one or more other local or remote computing device(s). For instance, the communication connection(s) 308 may facilitate communication with other local computing device(s) on the vehicle 302 and/or the drive system(s) 310. Also, the communication connection(s) 308 may allow the vehicle 302 to communicate with other nearby computing device(s) (e.g., other nearby vehicles, traffic signals, etc.). The communications connection(s) 308 also enable the vehicle 302 to communicate with remote teleoperations computing device or other remote services.

The communications connection(s) 308 may include physical and/or logical interfaces for connecting the vehicle computing device 304 to another computing device (e.g., computing device(s) 102) and/or a network. For example, the communications connection(s) 308 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive systems 310. In some examples, the vehicle 302 may have a single drive system 310. In at least one example, if the vehicle 302 has multiple drive systems 310, individual drive systems 310 can be positioned on opposite ends of the vehicle 302 (e.g., the front and the rear, etc.). In at least one example, the drive system(s) 310 can include one or more sensor systems 306 to detect conditions of the drive system(s) 310 and/or the surroundings of the vehicle 302, as discussed above. By way of example and not limitation, the sensor system(s) 306 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 310. In some cases, the sensor system(s) 306 on the drive system(s) 310 can overlap or supplement corresponding systems of the vehicle 302.

In at least one example, the components discussed herein can process sensor data, as described above, and may send their respective outputs, over one or more network(s), to one or more remote computing device(s). In at least one example, the components discussed herein may send their respective outputs to the one or more computing device(s) 102 at a particular frequency, after a lapse of a predetermined period of time, in near real-time, etc.

In some examples, the vehicle 302 can send sensor data to one or more computing device(s) 102 via network(s). In some examples, the vehicle 302 can send raw sensor data to the remote computing device(s). In other examples, the vehicle 302 can send processed sensor data and/or representations of sensor data (for instance, the object perception tracks) to the remote computing device(s). In some examples, the vehicle 302 can send sensor data to the remote computing device(s) at a particular frequency, after a lapse of a predetermined period of time, in near real-time, etc. In some cases, the vehicle 302 can send sensor data (raw or processed) to the remote computing device(s) as one or more log files.

In some examples, aspects of the perception component 318, the prediction component 320, and the planning component 322 may be implemented as one or more machine learned models, such as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 312 of the vehicle 302 may be any suitable processor capable of executing instructions to process data and perform operations as described herein. By way of example and not limitation, the processor(s) 312 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 314 are examples of non-transitory computer-readable media. The computer readable media 314 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. In other examples, other configurations are used.

Figure 4:
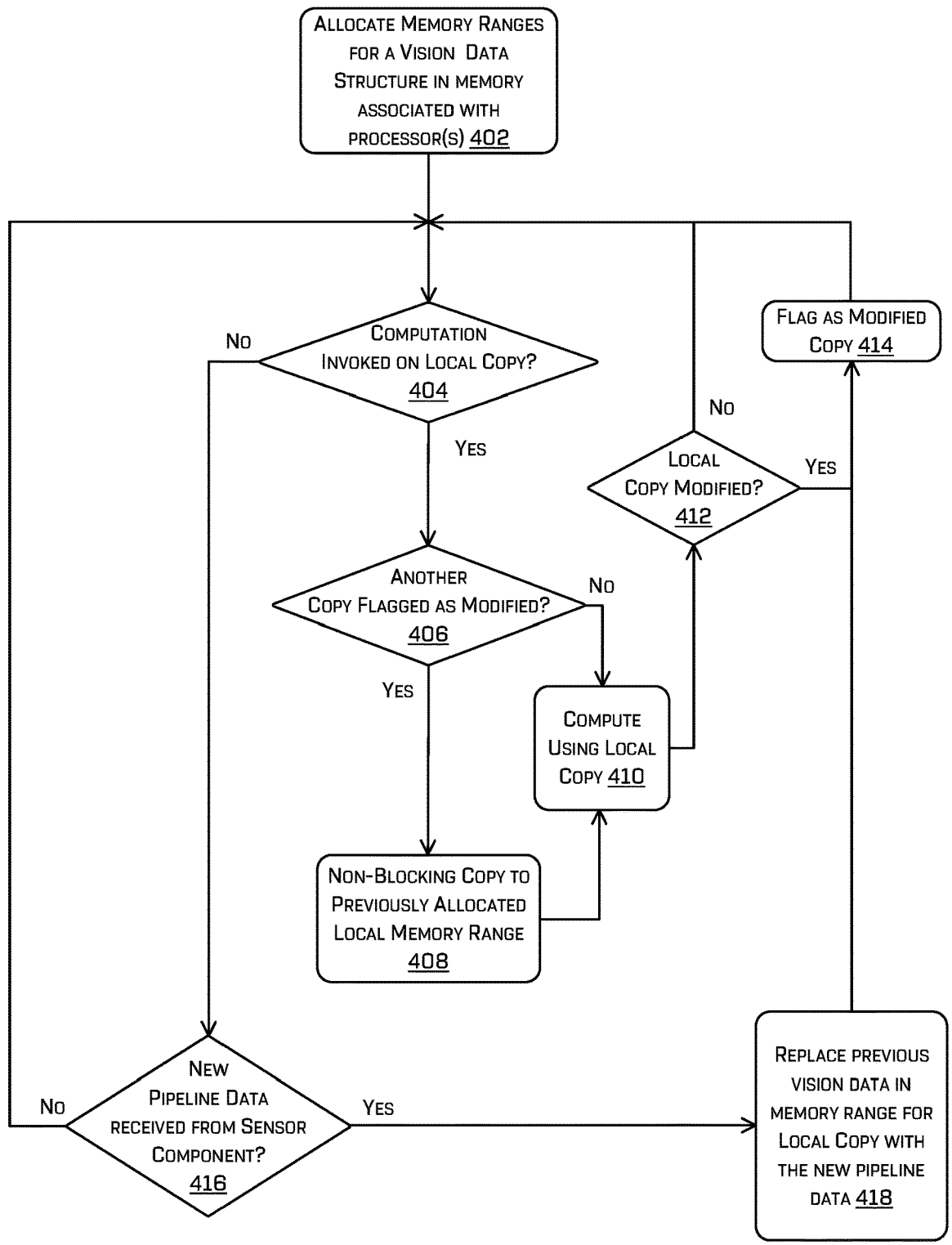
FIG. 4 illustrates an example process for maintaining and synchronizing vision data across multiple processors.

FIG. 4 illustrates an example process 400 for allocating, maintaining, and synchronizing vision data in a vision data structure across multiple processors (e.g. one or more CPUs and GPUs). More particularly, process 400 may relate to the logic or process flow of a synchronization management component of a vision data structure (e.g. synchronization management component 126 of vision data structure 120). This process 400 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The process 400 can be performed by any component, such as the first processing unit 104 of FIG. 1, the second processing unit 106 of FIG. 1, the vehicle computing device 304 of FIG. 3, another processing unit or computing device, etc. For ease of discussion, the process 400 will be discussed in the context of FIG. 1. More particularly, prior to operation 402, the vision data structure 120 may have been instantiated and the synchronization management component 126 may be initialized.

In FIG. 4, at 402, the synchronization management component 126 may operate to allocate memory ranges for a vision data structure in the memory or memories associated with one or more processor(s). For example, the synchronization management component 126 may allocate memory ranges for one or more of the CPU data 122 and GPU data 124. As discussed above, in some examples, the synchronization management component 126 may be configured to allocate memory ranges in each memory 110 and 114 upon initialization of the synchronization management component 126. In other examples, the synchronization management component 126 may allocate memory ranges in the memory of a processor which is most often involved in vision processing. More particularly, in some examples, one or more of the processors may be involved in some but not all vision processing. For example, vision processing may be performed on a CPU and not on the GPU for some iterations of sensor data. In such cases, the synchronization management component 126 may operate allocate memory ranges for CPU data 122 and delay allocating memory ranges for GPU data 124 until operations are invoked on the second processing unit 106.

The remainder of the process 400 discussed below is described from the perspective of the synchronization management component 126 operating on a particular processor (e.g. on the processor 108 or processor 112). The vision data at the processor from which the synchronization management component in question operating is referred to as the local copy and vision data in memory of other processors is referred to as other or remote copies.

At 404, the synchronization management component 126 may determine whether computation has been invoked on the local copy of the vision data. For example, the synchronization management component 126 operating on the first processing unit 104 may determine whether vision processing operations have been invoked on the CPU data 122. If operations have been invoked on a local copy, the process continues to 406. Otherwise the process may continue to 416.

At 406, the synchronization management component 126 may determine whether another copy of the vision data is flagged as modified. As discussed above, copies of vision data may be flagged use a time stamp, a counter or another indicator to allowing another synchronization management component 126 of another processor to determine the flagged vision data is updated or modified and whether to perform a synchronization of its own data with the flagged data (e.g. because its own copy is outdated). If another copy of the vision data is flagged as modified, the process may continue to 408. Otherwise, the process may continue to 410.

At 408, the synchronization management component 126 may perform a non-blocking copy operation of the flagged copy of the vision data to the previously allocated local memory range used to store the local copy. In other words, in some examples, the synchronization management component 126 may replace the current local copy using the same memory range.

At 410, the computation invoked on the local copy is performed. For example, vision processing operations may be performed by the vision pipeline 118 on the CPU data 122. At 412, the synchronization management component 126 may determine whether the local copy was modified. If so, the process may continue to 414. Otherwise, the process may return to 404.

At 414, the synchronization management component 126 may flag the local copy as being modified. As discussed above, the local copy may be flagged using any indicator that will allow the synchronization management component 126 operating on another processor to determine that the local copy is more up-to-date than its own copy. The process may then continue to 404.

Returning to 416, which may be performed following determination at 404 that computation has not been invoked on the local copy, the synchronization management component 126 may determine whether new pipeline data has been received from the sensor component (e.g. sensor systems 306). If so, the process may continue to 418. Otherwise, the process may return to 404.

At 418, the synchronization management component 126 may operate to replace the previous vision data in the memory location for the local copy of at least one processor with the new pipeline data received from the sensor component (e.g. with vision data received as pipeline data). The process may then continue to 414 where the local copy including the new data may be flagged as a modified copy. Similar to the initial allocation of memory, new sensor data may be stored on one of the memories, rather than updating all of the memories. By indicating the new copy as being modified, synchronization may be performed the next time computation is invoked for the remote copies.

Figure 5:
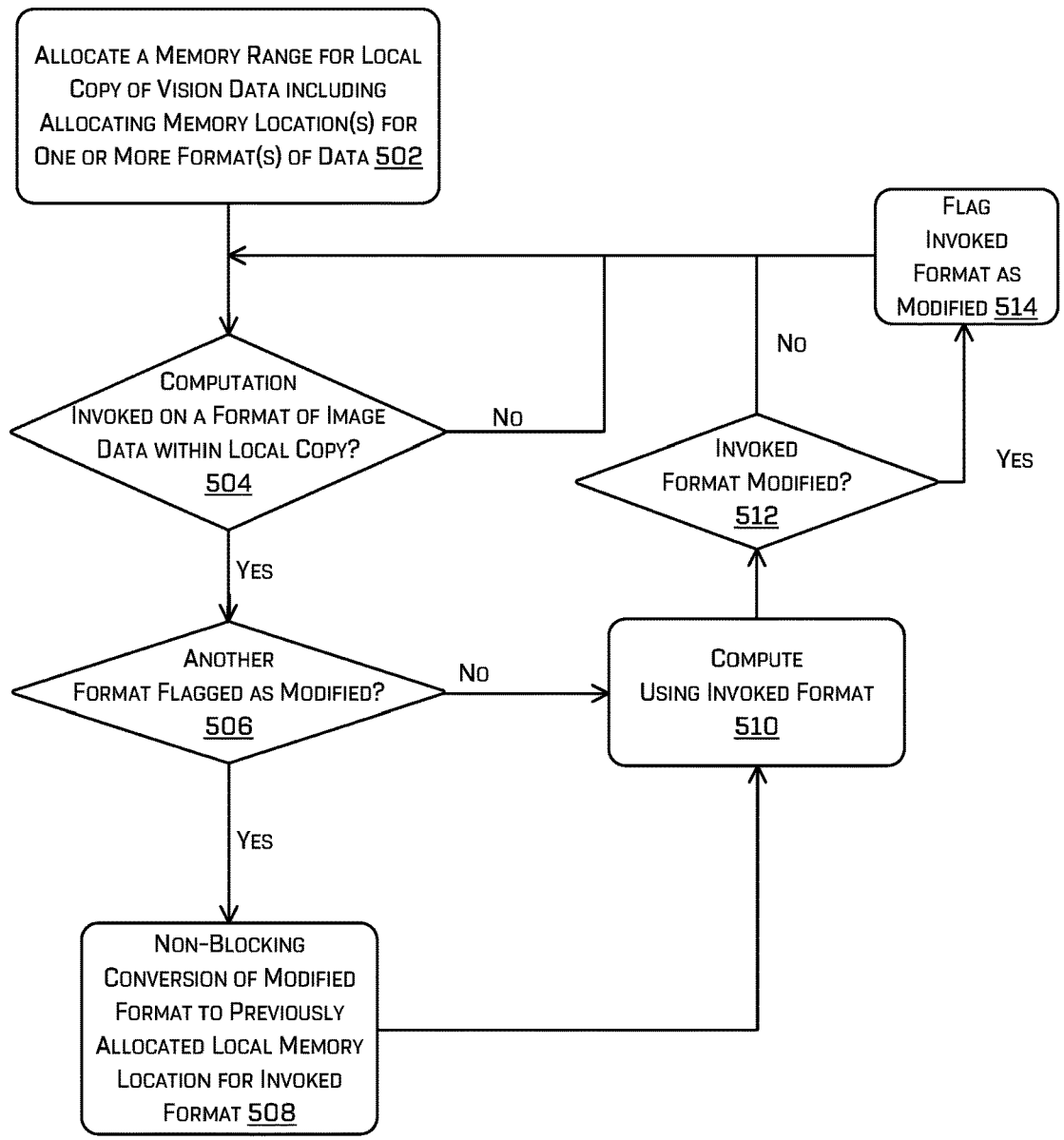
FIG. 5 illustrates an example process for maintaining and synchronizing vision data across formats.

FIG. 5 illustrates an example process 500 for maintaining multiple formats of vision data, e.g. image data, within a vision data structure. For example, the process 500 may provide for efficient maintenance and synchronization between the image data in format 1 128 and the image data in format 2 within the CPU data 122 of FIG. 1. This process 500 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

While the process 500 is discussed in the context of operations with multiple processors, the maintenance and synchronization of multiple formats of vision data is not limited to multiprocessor implementations. Instead, in some examples, the techniques discussed and illustrated in FIG. 5 may be utilized in a single processor system or in a system that does not perform synchronization across processor memories in the manner discussed above with regard to FIG. 4.

At 502, the synchronization management component 126 may allocate a memory range for a local copy of vision data including allocating memory locations for multiple formats of data. This operation may be similar to operation 402 discussed above. While discussed herein as initially allocating memory locations for multiple formats of data, the synchronization management component 126 may allocate a memory range for a local copy of vision data including allocating a memory location for a current format of the data and allocate the memory location(s) for other format(s) of the data when a first operation is invoked which utilizes the other format of the data.

The operations 504-514 are discussed below in the context of operation 410 or as occurring prior to operation 410 in FIG. 4. More particularly, the discussion of operations 504-514 below assumes that the local copy does not need to be synchronized to a remote copy. Alternatively, operations 504-514 may be performed in an example that does not synchronize copies between memories as discussed above with regard to FIG. 4.

At 504, the synchronization management component 126 may determine whether computation has been invoked on a format of image data within the local copy of the vision data. For example, the synchronization management component 126 may determine whether vision processing operations have been invoked on the image data in format 1 128 of the CPU data 122. If operations have been invoked on a format of image data within the local copy, the process may continue to 506. Otherwise the process may return to 504 and continue checking for an invocation of computation.

At 506, the synchronization management component 126 may determine whether another format of the vision data has been flagged as modified. For example, when vision processing operations are to be performed on the image data in format 1 128, the synchronization management component 126 may determine whether the image data in format 2 130 has been flagged as modified. As with the flagging of copies of vision data, the flagging of image data in a particular format may indicate that it is the most recent image data following a modification and that synchronization of other formats should be performed before those formats are utilized. If another format has been flagged as modified, the process may continue to 508. Otherwise, the process may continue to 510.

At 508, the synchronization management component 126 may perform a non-blocking conversion of the image data in the modified format into the invoked format. The image data in the invoke format may then be replaced with the result of the conversion. In other words, in some examples, the synchronization management component 126 may utilize the same memory location to store the new image data in the invoked format (e.g. image data in format 2 may be converted to format 1 and stored in the same memory location as the outdated image data in format 1). In the case of the synchronization management component 126 allocating memory locations for formats of data as needed, the synchronization management component 126 may determine if the memory location has not yet been allocated (e.g., this is the first time that the corresponding format has been invoked) and allocate the memory location as part of the conversion operation.

At 510, the invoked computation may be performed. For example, vision processing operations may be performed by the vision pipeline 118 on the image data in format 1 128 of the CPU data 122. At 512, the synchronization management component 126 may determine whether the invoked format of image data was modified. If so, the process may continue to 514. Otherwise, the process may return to 504.

At 514, the synchronization management component 126 may flag the invoked format as being modified. As discussed above, the invoked format may be flagged using any indicator that will allow the synchronization management component 126 to determine that the invoked format is more up-to-date than other formats of image data. In multiprocessor operations utilizing techniques such as those discussed above with regard to FIG. 4, the flagging of the invoked format as being modified may also include flagging the local copy of the vision data as being modified. The process may then continue to 504.

While the above-described synchronization between different formats of the image data is shown as being handled separately from the synchronization between memories of different processors, implementations are not so limited. For example, some implementations may include a synchronization across both memories and formats. In a particular example, the implementation may operate to perform a nonblocking copy and transpose operation between memories of different processors. Depending on the implementation, such an operation may be performed by a memory controller or by one of the processors during the data transfer.

In an example, in response to an invocation of operations on a first format of data, the processor performing the operations may determine the flags associated with the local copy of the data and a remote copy of the data indicates the remote copy is the most up to date copy but that format 2 of the data in the remote copy is the most up to date format of the data. In the examples shown in the FIGS., synchronization may be handled by performing a non-blocking copy of the remote copy into the memory location of the local copy, then performing a conversion of the data from the second format to the first format and replacing the data in the first format in the local copy with the converted data in the first format. In the above discussed alternative example, the transpose and replacement between formats may be performed during the copy operation. For example, a memory controller may be configured to perform a transpose operation on the data in the second format to generate the data in the first format during the non-blocking copy operation.

Many other variations would be understood by one of skill in the art in view of this disclosure.

Example Clauses

Clause A: A method performed by one or more processors of an autonomous operation system of an autonomous vehicle, the method comprising: determining, in response to an invocation of vision processing on first vision data stored in a first memory range in a first memory associated with a central processing unit (CPU) of the one or more processors, that second vision data stored in a second memory range in a second memory associated with a graphic processing unit (GPU) of the one or more processors is a modified copy of the first vision data; replacing, using a non-blocking operation, the first vision data stored in the first memory range with the second vision data from the second memory range; and performing, by the CPU, the vision processing using the second vision data stored in the first memory range.

Clause B: The method of Clause A, further comprising: determining, in response to an invocation of another vision processing on the second vision data stored in the second memory, that third vision data stored in the first memory range is a modified copy of the second vision data; replacing, using another non-blocking operation, the second vision data stored in the second memory range with the third vision data from the first memory range; and performing, by the GPU, the other vision processing using the third vision data stored in the second memory range.

Clause C: The method of Clause A, wherein: the first memory range comprises a first memory location that stores a first copy of image data of the second vision data is associated with a first format and a second memory location that stores a second copy of the image data of the second vision data associated with a second format; and the vision processing operates on the first format; and the performing, by the CPU, the vision processing comprises: determining that the second copy of the image data in the second format has been modified; converting, using another non-blocking operation, the second copy stored in the first memory location from the second format into a third copy of the image data in the first format; replacing the first copy of the image data in the first memory location with the third copy; and performing, by the CPU, the vision processing using the third copy stored in the first memory location.

Clause D: The method of Clause A, further comprising: receiving third vision data from a sensor system of the autonomous vehicle; and replacing the second vision data stored in the first memory range with the third vision data received from the sensor system.

Clause E: The method of Clause A, further comprising: during an initialization of the autonomous operation system, instantiating a vision data structure configured to maintain vision data between the first memory and the second memory comprising allocating the first memory range in the first memory, wherein the first memory range comprises a first memory location and a second memory location; receiving, by the CPU subsequent to initialization of the autonomous operation system, third vision data from a sensor system of the autonomous vehicle, the third vision data comprising first image data in a first format; storing the third vision data in the first memory range comprising storing the first image data at the first memory location; in response to an invocation of another vision processing on the GPU, allocating the second memory range in the second memory, wherein the second memory range comprises a third memory location and a fourth memory location and the other vision processing operates on a second format; obtaining, using another non-blocking operation, the third vision data from the first memory range; storing the third vision data in the second memory range comprising storing the first image data at the third memory location; performing, by the GPU, the other vision processing using the third vision data stored in the second memory comprising: determining that the third vision data does not comprise second image data in the second format; converting the first image data in the first format into the second image data in the second format; storing the second image data in the fourth memory location; and performing, by the GPU, the other vision processing using the second image data stored in the fourth memory location; and wherein the vision data structure is configured to reuse the first memory range and the second memory range for subsequent vision processing on further sensor data received during operation of the autonomous operation system of the autonomous vehicle.

Clause F: One or more non-transitory computer-readable media storing instructions that, when executed, cause one or more processors to perform operations comprising: in response to an invocation of processing on first data stored in a first memory range in a first memory associated with a first processor of the one or more processors, determining that second data stored in a second memory range in a second memory associated with a second processor of the one or more processors is a modified copy of the first data; replacing, using a non-blocking operation, the first data stored in the first memory range with the second data obtained from the second memory range; and performing, by the first processor, the processing using the second data stored in the first memory range.

Clause G: The one or more non-transitory computer-readable media of Clause F, the operations further comprising: in response to an invocation of another processing on the second data stored in the second memory range in the second memory associated with the second processor, determining that third data stored in the first memory range is a modified copy of the second data; replacing, using another non-blocking operation, the second data stored in the second memory range with the third data obtained from the first memory range; and performing, by the second processor, the other processing using the third data stored in the second memory range.

Clause H: The one or more non-transitory computer-readable media of Clause F, wherein the first memory range comprises a first memory location that stores a first copy of image data of the second data in a first format and a second memory location that stores a second copy of the image data of the second data in a second format and the processing operates on the first format; and the performing, by the first processor, the processing comprises: determining that the second copy of the image data in the second format has been modified; converting, using other non-blocking operation, the second copy stored in the first memory location from the second format into a third copy of the image data in the first format; replacing the first copy of the image data in the first memory location with the third copy; and performing, by the first processor, the processing using the third copy stored in the first memory location.

Clause I: The one or more non-transitory computer-readable media of Clause F, wherein the operations are performed by a computing device of an autonomous vehicle.

Clause J: The one or more non-transitory computer-readable media of Clause I, the operations further comprising: receiving, by the first processor, a third data from a sensor system of the autonomous vehicle; and replacing the second data stored in the first memory range with the third data received from the sensor system.

Clause K: The one or more non-transitory computer-readable media of Clause J, the operations further comprising: in response to an invocation of another processing on the second data stored in the second memory range in the second memory associated with the second processor, determining that third data stored in the first memory range is more recent data than the second data; obtaining, using another non-blocking operation, the third data from the first memory range; replacing the second data stored in the second memory range with the third data obtained from the first memory range; and performing, by the second processor, the other processing using the third data stored in the second memory range.

Clause L: The one or more non-transitory computer-readable media of Clause I, the operations further comprising: during an initialization of the computing device, instantiating a data structure configured to maintain data between the first memory and the second memory comprising allocating the first memory range in the first memory, wherein the first memory range comprising a first memory location and a second memory location; receiving, by the first processor and subsequent to initialization of the computing device, a third data from a sensor system of the autonomous vehicle, the third data comprising first image data in a first format; and storing the third data in the first memory range comprising storing the first image data at the first memory location; in response to an invocation of another processing on the second processor, allocating the second memory range in the second memory, wherein the second memory range comprises a third memory location and a fourth memory location and the other processing operates on a second format; replacing, using another non-blocking operation, the third data in the second memory range comprising storing the first image data at the third memory location; and performing, by the second processor, the other processing using the third data stored in the second memory comprising: determining that the third data does not comprise second image data in the second format; converting the first image data in the first format into the second image data in the second format; storing the second image data in the fourth memory location; and performing, by the second processor, the other processing using the second image data stored in the fourth memory location.

Clause M: The one or more non-transitory computer-readable media of Clause I, wherein the first processor is a central processing unit (CPU) of the autonomous vehicle and the second processor is a graphic processing unit (GPU) of the autonomous vehicle.

Clause N: The one or more non-transitory computer-readable media of Clause I, the operations further comprising: during an initialization of the computing device, instantiating a data structure configured to maintain data between the first memory and the second memory comprising reusing the first memory range and the second memory range for subsequent processing on further sensor data received during operation of the autonomous vehicle.

Clause O: A system comprising: one or more processors; and one or more computer-readable media storing instructions executable by the one or more processors, wherein the instructions, when executed, cause the one or more processors to perform operations comprising: in response to an invocation of processing that operates on a first format of data stored as a first copy of the data in a first memory location in a first memory range of a first memory associated with a first processor of the one or more processors: determining a second copy of the data associated with a second format stored in a second memory location in the first memory range is a modified copy of the first copy of the data; converting, using a non-blocking operation, the second copy stored in the second memory location from the second format into a third copy of the data in the first format; replacing the first copy of the data in the first memory location with the third copy; and performing, by the first processor, the processing using the third copy stored in the first memory location.

Clause P: The system of Clause O, further comprising: in response to an invocation of another processing by the first processor that operates on the second format of the data, determining that a second memory range in a second memory associated with a second processor of the one or more processors stores a more recent copy of the data than stored in the first memory range, wherein the more recent copy of the data is associated with the first format; obtaining, using another non-blocking operation, the more recent copy of the data from the second memory range; replacing, as a fourth copy of the data, the third copy in the first memory location with the more recent copy of the data obtained from the second memory range; converting, using a non-blocking operation, the fourth copy into a fifth copy of the data in the second format; replacing the second copy of the data in the second memory location with the fifth copy; and performing, by the first processor, the other processing using the fifth copy stored in the second memory location.

Clause Q: A system comprising: one or more processors; and one or more computer-readable media storing instructions executable by the one or more processors, wherein the instructions, when executed, cause the one or more processors to perform operations comprising: receiving first data, the first data associated with a first format; storing the first data within a first memory range of first memory accessible by a first processor of the one or more processors; in response to an invocation of processing on second data in a second format stored in a second memory range in a second memory accessible by a second processor of the one or more processors: determining, by the second processor, that the first data is a modified copy of the second data; determining, by the second processor, a first transpose of the first data, the first transpose associated with the second format; replacing, by the second processor and as third data, the second data within the second memory range with the first transpose of the first data; and performing an operation associated with the invocation of processing by the second processor based at least in part on the third data.

Clause R: The system of Clause Q, wherein an output of the operation comprises modified third data, the operations further comprising: replacing, by the second processor, the third data within the second memory range with the modified third data; subsequent to the performing of the operation and in response to an invocation of another processing on the first data in the first format stored in the first memory range in the first memory, determining, by the first processor, that the modified third data is a modified copy of the first data; determining a second transpose of the modified third data, the second transpose associated with the first format; and storing, in the first memory range, the second transpose.

Clause S: The system of Clause Q, wherein the system is an autonomous operation system of an autonomous vehicle, the first processor is a central processing unit (CPU) of an autonomous vehicle, the second processor is a graphic processing unit (GPU) of the autonomous vehicle, and the operation associated with invocation of processing by the second processor is a vision processing operation, the operations further comprising: detect an object based at least in part on an output of the operation associated with invocation of processing by the second processor; generating control information for an autonomous vehicle based on the object; and controlling the autonomous vehicle based on the control information.

Clause T: The system of Clause Q, wherein the determining of the first transpose and the replacing the second data are performed using non-blocking operations.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method performed by one or more processors of an autonomous operation system of an autonomous vehicle, the method comprising:
    determining, in response to an invocation of vision processing on first vision data stored in a first memory range in a first memory associated with a central processing unit (CPU) of the one or more processors, that second vision data stored in a second memory range in a second memory associated with a graphic processing unit (GPU) of the one or more processors is a modified copy of the first vision data;
    replacing, using a non-blocking operation, the first vision data stored in the first memory range with the second vision data from the second memory range; and
    performing, by the CPU, the vision processing using the second vision data stored in the first memory range;
    wherein:
        the first memory range comprises a first memory location that stores a first copy of image data of the second vision data associated with a first format and a second memory location that stores a second copy of the image data of the second vision data associated with a second format;
        the vision processing operates on the first format; and
        the performing, by the CPU, the vision processing comprises:
            determining that the second copy of the image data in the second format has been modified; and
            converting, using another non-blocking operation, the second copy stored in the first memory location from the second format into a third copy of the image data in the first format; and
        a vision data structure is configured to reuse the first memory range and the second memory range for subsequent vision processing on further sensor data received during operation of the autonomous operation system of the autonomous vehicle.

2. The method of claim 1, further comprising:
    determining, in response to an invocation of another vision processing on the second vision data stored in the second memory, that third vision data stored in the first memory range is a modified copy of the second vision data;
    replacing, using a third non-blocking operation, the second vision data stored in the second memory range with the third vision data from the first memory range; and
    performing, by the GPU, the other vision processing using the third vision data stored in the second memory range.

3. The method of claim 1, wherein:
    the performing, by the CPU, the vision processing further comprises:
        replacing the first copy of the image data in the first memory location with the third copy; and
        performing, by the CPU, the vision processing using the third copy stored in the first memory location.

4. The method of claim 1, further comprising:
    receiving third vision data from a sensor system of the autonomous vehicle; and
    replacing the second vision data stored in the first memory range with the third vision data received from the sensor system.

5. The method of claim 1, further comprising:
    during an initialization of the autonomous operation system, instantiating the vision data structure configured to maintain vision data between the first memory and the second memory comprising allocating the first memory range in the first memory;
    receiving, by the CPU subsequent to initialization of the autonomous operation system, third vision data from a sensor system of the autonomous vehicle, the third vision data comprising first image data in the first format;
    storing the third vision data in the first memory range comprising storing the first image data at the first memory location;
    in response to an invocation of another vision processing on the GPU, allocating the second memory range in the second memory, wherein the second memory range comprises a third memory location and a fourth memory location and the other vision processing operates on the second format;

obtaining, using a third non-blocking operation, the third vision data from the first memory range;

storing the third vision data in the second memory range comprising storing the first image data at the third memory location;

performing, by the GPU, the other vision processing using the third vision data stored in the second memory comprising:
  determining that the third vision data does not comprise second image data in the second format;
  converting the first image data in the first format into the second image data in the second format;
  storing the second image data in the fourth memory location; and
  performing, by the GPU, the other vision processing using the second image data stored in the fourth memory location.

6. One or more non-transitory computer-readable media storing instructions that, when executed, cause one or more processors to perform operations comprising:
  in response to an invocation of processing on first data stored in a first memory range in a first memory associated with a first processor of the one or more processors, determining that second data stored in a second memory range in a second memory associated with a second processor of the one or more processors is a modified copy of the first data;
  replacing, using a non-blocking operation, the first data stored in the first memory range with the second data obtained from the second memory range; and
  performing, by the first processor, the processing using the second data stored in the first memory range;
  wherein:
    the first memory range comprises a first memory location that stores a first copy of image data of the second data in a first format and a second memory location that stores a second copy of the image data of the second data in a second format and the processing operates on the first format; and
    the performing, by the first processor, the processing comprises:
      determining that the second copy of the image data in the second format has been modified;
      converting, using another non-blocking operation, the second copy stored in the first memory location from the second format into a third copy of the image data in the first format; and
    a data structure is configured to reuse the first memory range and the second memory range for subsequent processing.

7. The one or more non-transitory computer-readable media of claim 6, the operations further comprising:
  in response to an invocation of another processing on the second data stored in the second memory range in the second memory associated with the second processor, determining that third data stored in the first memory range is a modified copy of the second data;
  replacing, using a third non-blocking operation, the second data stored in the second memory range with the third data obtained from the first memory range; and
  performing, by the second processor, the other processing using the third data stored in the second memory range.

8. The one or more non-transitory computer-readable media of claim 6, wherein the performing, by the first processor, the processing further comprises:
  replacing the first copy of the image data in the first memory location with the third copy; and
  performing, by the first processor, the processing using the third copy stored in the first memory location.

9. The one or more non-transitory computer-readable media of claim 6, wherein the operations are performed by a computing device of an autonomous vehicle.

10. The one or more non-transitory computer-readable media of claim 9, the operations further comprising:
  receiving, by the first processor, a third data from a sensor system of the autonomous vehicle; and
  replacing the second data stored in the first memory range with the third data received from the sensor system.

11. The one or more non-transitory computer-readable media of claim 9, the operations further comprising:
  in response to an invocation of another processing on the second data stored in the second memory range in the second memory associated with the second processor, determining that third data stored in the first memory range is more recent data than the second data;
  obtaining, using a third non-blocking operation, the third data from the first memory range;
  replacing the second data stored in the second memory range with the third data obtained from the first memory range; and
  performing, by the second processor, the other processing using the third data stored in the second memory range.

12. The one or more non-transitory computer-readable media of claim 9, the operations further comprising:
  during an initialization of the computing device, instantiating the data structure configured to maintain data between the first memory and the second memory comprising allocating the first memory range in the first memory;
  receiving, by the first processor and subsequent to initialization of the computing device, a third data from a sensor system of the autonomous vehicle, the third data comprising first image data in the first format; and
  storing the third data in the first memory range comprising storing the first image data at the first memory location;
  in response to an invocation of another processing on the second processor, allocating the second memory range in the second memory, wherein the second memory range comprises a third memory location and a fourth memory location and the other processing operates on the second format;
  replacing, using a third non-blocking operation, the third data in the second memory range comprising storing the first image data at the third memory location; and
  performing, by the second processor, the other processing using the third data stored in the second memory comprising:
    determining that the third data does not comprise second image data in the second format;
    converting the first image data in the first format into the second image data in the second format;
    storing the second image data in the fourth memory location; and
    performing, by the second processor, the other processing using the second image data stored in the fourth memory location.

13. The one or more non-transitory computer-readable media of claim 9, wherein the first processor is a central processing unit (CPU) of the autonomous vehicle and the second processor is a graphic processing unit (GPU) of the autonomous vehicle.

14. The one or more non-transitory computer-readable media of claim 9, the operations further comprising:
during an initialization of the computing device, instantiating the data structure configured to maintain data between the first memory and the second memory.

15. A system comprising:
one or more processors; and
one or more non-transitory computer-readable media storing instructions executable by the one or more processors, wherein the instructions, when executed, cause the one or more processors to perform operations comprising:
in response to an invocation of processing that operates on a first format of data stored as a first copy of the data in a first memory location in a first memory range of a first memory associated with a first processor of the one or more processors:
determining a second copy of the data associated with a second format stored in a second memory location in the first memory range is a modified copy of the first copy of the data;
converting, using a non-blocking operation, the second copy stored in the second memory location from the second format into a third copy of the data in the first format;
replacing the first copy of the data in the first memory location with the third copy; and
performing, by the first processor, the processing using the third copy stored in the first memory location;
wherein a data structure is configured to reuse the first memory range and a second memory range for subsequent.

16. The system of claim 15, further comprising:
in response to an invocation of another processing by the first processor that operates on the second format of the data,
determining that the second memory range in a second memory associated with a second processor of the one or more processors stores a more recent copy of the data than stored in the first memory range, wherein the more recent copy of the data is associated with the first format;
obtaining, using another non-blocking operation, the more recent copy of the data from the second memory range;
replacing, as a fourth copy of the data, the third copy in the first memory location with the more recent copy of the data obtained from the second memory range;
converting, using a non-blocking operation, the fourth copy into a fifth copy of the data in the second format;
replacing the second copy of the data in the second memory location with the fifth copy; and
performing, by the first processor, the other processing using the fifth copy stored in the second memory location.

17. A system comprising:
one or more processors; and
one or more non-transitory computer-readable media storing instructions executable by the one or more processors, wherein the instructions, when executed, cause the one or more processors to perform operations comprising:
receiving first data, the first data associated with a first format;
storing the first data within a first memory range of first memory accessible by a first processor of the one or more processors;
in response to an invocation of processing on second data in a second format stored in a second memory range in a second memory accessible by a second processor of the one or more processors:
determining, by the second processor, that the first data is a modified copy of the second data;
determining, by the second processor, a first transpose of the first data, the first transpose associated with the second format;
replacing, by the second processor and as third data, the second data within the second memory range with the first transpose of the first data; and
performing an operation associated with the invocation of processing by the second processor based at least in part on the third data;
wherein a data structure is configured to reuse the first memory range and the second memory range for subsequent processing and wherein an output of the operation comprises modified third data, the operations further comprising:
replacing, by the second processor, the third data within the second memory range with the modified third data;
subsequent to the performing of the operation and in response to an invocation of another processing on the first data in the first format stored in the first memory range in the first memory, determining, by the first processor, that the modified third data is a modified copy of the first data;
determining a second transpose of the modified third data, the second transpose associated with the first format; and
storing, in the first memory range, the second transpose.

18. The system of claim 17, wherein the system is an autonomous operation system of an autonomous vehicle, the first processor is a central processing unit (CPU) of the autonomous vehicle, the second processor is a graphic processing unit (GPU) of the autonomous vehicle, and the operation associated with invocation of processing by the second processor is a vision processing operation, the operations further comprising:
detecting an object based at least in part on an output of the operation associated with invocation of processing by the second processor;
generating control information for the autonomous vehicle based on the object; and
controlling the autonomous vehicle based on the control information.

19. The system of claim 17, wherein the determining of the first transpose and the replacing the second data are performed using non-blocking operations.

* * * * *